United States Patent Office 2,767,094
Patented Oct. 16, 1956

2,767,094

POULTRY AND SWINE FEED

Alexander Frieden, Whitefish Bay, and Robert M. Stern, Milwaukee, Wis., assignors to Pabst Brewing Company, Milwaukee, Wis., a corporation of Delaware No Drawing. Application September 26, 1952, Serial No. 311,804

14 Claims. (Cl. 99—2)

This invention relates to improved feeds for animal feeding and to an improved method of feeding animals. It is particularly applicable to non-ruminant animals such as poultry and swine.

Generally, when feed is ingested by an animal, it is acted upon by the enzymes secreted in the animal body. These enzymes split the feed substances into simpler molecules which allow them to be absorbed readily by the animal, and, consequently, to be utilized for energy and growth. In the case of ruminant animals, this process of splitting the complex molecules to simpler more readily assimilated ones, is greatly enhanced by the tremendous number of microorganisms present in the rumen and other parts of the intestinal tract. In the ruminant animals, too, the alimentary canals are relatively long and the ingested feed is subjected to the action of digestive juices for a comparatively long period. By this means, more of the nutrients from the complex feed are made available to this type of animal for growth and energy.

In the case of non-ruminant animals, and particularly those possessing short alimentary canals, the ingested feed is subjected principally to the action of the digestive juices naturally secreted by the pancreas and other organs of the animal. In the case of poultry and swine, animals with short alimentary canals, the feed passes through their systems in a comparatively short period of time, a time frequently insufficient for thorough digestion of the feed substances. This often results in a portion of feed passing the alimentary canal without the necessary chemical changes or modifications to render it suitable for quick absorption and utilization by the animal system.

It is an object of this invention to improve the efficiency of feed utilization by the animal through the addition of certain substances in small amounts, which would make the feed more readily available to the animal system.

An additional object of the invention is to provide a new and improved method of feeding animals in order to improve the efficiency of feed utilization by the animal.

A further object of the invention is to provide an animal feed which will increase the rate of growth of the animals.

Another object of the invention is to provide a new and improved method of feeding animals in order to accelerate the growth of the animals.

Still another object of the invention is to provide new and improved animal feeds of the type described and a new and improved method of feeding animals which is particularly adaptable to non-ruminant animals having short alimentary canals, such as poultry and swine. Other objects will appear hereinafter.

In accordance with the invention, we have found that the addition of substances which are water soluble and may be characterized by the general term of "thickening agents" accelerates the rate of growth and improves feed utilization.

The term "feed efficiency" as used herein means the average of the number of pounds of feed required to produce a gain of one pound of weight in the animals tested.

By way of illustration, the following ration has been used for chicks and will be designated in the examples to follow as the basal diet. It is a diet fully adequate for chick feeding.

Basal feed formula

| Ground yellow | percent | 50 |
| Wheat bran | do | 5 |
| Wheat middlings | do | 5 |
| Dehydrated alfalfa leaf meal | do | 5 |
| Soybean oil meal | do | 22 |
| Steamed bone meal | do | 2 |
| Granite grit | do | 2 |
| Ground oyster shell | do | 2 |
| Iodized salt | do | 0.5 |
| Vitamin A and D oil (2250 A—400 D) | do | 0.4 |
| Manganese sulfate | grams/kg | 0.22 |
| Riboflavin | mg./kg | 2.8 |
| Vitamin B12 | micrograms per kilogram (mcg./kg.) | 10.0 |

After the addition of the designated supplement, enough soybean oil meal is added to the basal ration to bring it up to 100%. In other words, the supplement is added at the expense of the soybean oil meal.

The invention will be further illustrated but is not limited by the following examples which show the results obtained in chick feeding.

EXAMPLE I

| Feed | Weight after 8 Weeks, grams | Percentage Gain | Feed Efficiency |
|---|---|---|---|
| Basal | 917 | | 3.17 |
| Basal plus .1% carboxymethyl cellulose | 990 | 8 | 2.99 |
| Basal plus .1% carboxymethyl hydroxyethylcellulose | 988 | 7.75 | 2.91 |
| Basal plus .1% polyvinylpyrrolidone | 978 | 6.7 | 2.94 |

In the tests described in these examples chicks were fed for a period of 8 weeks. In all examples hatchery run chicks, three days old, were weighed, tagged and divided into groups of 15 to 20 birds. All groups consisted of an equal number of birds of the same weights and the average weights of all groups varied no more than 1 gram. All birds were weighed equally and the values reported in the examples are average weights for all birds of a group.

EXAMPLE II

The test procedure was the same as in Example I and the results were as follows:

| Feed | Weight after 8 Weeks, grams | Percentage Gain | Feed Efficiency |
|---|---|---|---|
| Basal | 917 | | 2.84 |
| Basal plus 0.1% sodium alginate | 963 | 5 | 2.86 |
| Basal plus 0.1% agar-agar | 935 | 1.9 | 2.86 |

The invention is illustrated further in the following example to show that an accelerated rate of growth is obtained by the addition of thickening agents to feeds containing antibiotic feed supplements.

EXAMPLE III

The test procedure was the same as in Example I and the results were as follows:

| Feed | Weight after 8 Weeks, grams | Percentage Gain | Feed Efficiency |
|---|---|---|---|
| Basal plus 0.1% carboxymethyl cellulose | 930 | | 2.80 |
| Basal plus 5.5 mg./kg. bacitracin | 969 | 4.2 | 2.67 |
| Basal plus 0.1% carboxymethyl cellulose plus 5.5 mg./kg. bacitracin | 1,000 | 7.5 | 2.80 |

As will be apparent, the addition of thickening agents produced a substantial acceleration of the rate of growth and also a substantial improvement in the feed efficiency.

The thickening agents which are employed for the purpose of this invention are characterized by the fact that the addition of a fraction of a percent of these substances to water will increase the viscosity of the resultant aqueous dispersion. For the purpose of the invention it is only necessary to employ a fraction of a percent of the thickening agent based on the total weight of the feed. In most cases, 0.05% to 0.5% of the thickening agent based on the weight of the feed is sufficient.

In general, the thickening agents which are preferably employed for the purpose of the invention can be described as being water-soluble at least to the extent that they will form a thickened aqueous solution or dispersion. In other words, they are hydrophilic rather than hydrophobic. Furthermore, the preferred thickening agents are characterized by the presence of a water solubilizing group attached to a complex organic nucleus, as, for example, a carboxy group, a carboxymethyl group, a hydroxy group, a hydroxy-ethyl group, a nitrogen-containing group attached to a cellulose structure or to a vinyl or related polymer. It is essential for the purpose of the invention that the thickening agents be non-toxic in the proportions in which they are employed.

While we do not know the exact reason for this growth stimulation, we believe that it may be due to the slowing down of the progress of the feed through the animal tract, thus permitting the digestive juices to act more thoroughly on the feed substances and make them more available for assimilation by the animal body.

As shown by the examples, animal feeds normally contain principally carbohydrates and proteins with minor amounts of fats, minerals, and other feed ingredients. The results obtained in the practice of the invention are especially valuable in the feeding of poultry or swine.

The invention can be used with antibiotic materials, with surfactants, with meat and fish products in the diet and in other ways obvious to men experienced in the science and practice of animal nutrition.

The invention is hereby claimed as follows:

1. Solid natural poultry and swine feeds containing carbohydrates and proteins as the principal ingredients and 0.05 to 0.5 percent by weight of a water-soluble thickening agent selected from the group consisting of carboxymethyl cellulose, carboxymethyl hydroxyethyl cellulose, polyvinylpyrrolidone, sodium alginate, and agar agar.

2. Solid natural poultry and swine feeds containing carbohydrates and proteins as the principal ingredients, an antibiotic substance, and 0.05 to 0.5 percent by weight of a water-soluble thickening agent selected from the group consisting of carboxymethyl cellulose, carboxymethyl hydroxyethyl cellulose, polyvinylpyrrolidone, sodium alginate, and agar agar.

3. Solid natural poultry and swine feeds containing carbohydrates and proteins as the principal ingredients and 0.05 to 0.5 percent by weight of carboxymethyl cellulose.

4. Solid natural poultry and swine feeds containing carbohydrates and proteins as the principal ingredients and 0.05 to 0.5 percent by weight of carboxymethyl hydroxyethyl cellulose.

5. Solid natural poultry and swine feeds containing carbohydrates and proteins as the principal ingredients and 0.05 to 0.5 percent by weight of polyvinylpyrrolidone.

6. Solid natural poultry and swine feeds containing carbohydrates and proteins as the principal ingredients and 0.05 to 0.5 percent by weight of sodium alginate.

7. Solid natural poultry and swine feeds containing carbohydrates and proteins as the principal ingredients and 0.05 to 0.5 percent by weight of agar agar.

8. Solid natural poultry and swine feeds containing carbohydrates and proteins as the principal ingredients and about .1% by weight of carboxymethyl cellulose.

9. Solid natural poultry and swine feeds containing carbohydrates and proteins as the principal ingredients and about .1% by weight of carboxymethyl hydroxyethyl cellulose.

10. Solid natural poultry and swine feeds containing carbohydrates and proteins as the principal ingredients and about .1% by weight of polyvinylpyrrolidone.

11. A solid natural poultry feed containing carbohydrates and proteins as the principal ingredients and 0.05 to 0.5 percent by weight of a water-soluble thickening agent selected from the group consisting of carboxymethyl cellulose, carboxymethyl hydroxyethyl cellulose, polyvinylpyrrolidone, sodium alginate, and agar agar.

12. A solid natural swine feed containing carbohydrates and proteins as the principal ingredients and 0.05 to 0.5 percent by weight of a water-soluble thickening agent selected from the group consisting of carboxymethyl cellulose, carboxymethyl hydroxyethyl cellulose, polyvinylpyrrolidone, sodium alginate, and agar agar.

13. A solid natural poultry feed containing carbohydrates and proteins as the principal ingredients, an antibiotic substance, and 0.05 to 0.5 percent by weight of a water-soluble thickening agent selected from the group consisting of carboxymethyl cellulose, carboxymethyl hydroxyethyl cellulose, polyvinylpyrrolidone, sodium alginate, and agar agar.

14. A solid natural swine feed containing carbohydrates and proteins as the principal ingredients, an antibiotic substance, and 0.05 to 0.5 percent by weight of a water-soluble thickening agent selected from the group consisting of carboxymethyl cellulose, carboxymethyl hydroxyethyl cellulose, polyvinylpyrrolidone, sodium alginate, and agar agar.

References Cited in the file of this patent

UNITED STATES PATENTS

| 987,849 | Block | Mar. 28, 1911 |
| 2,098,998 | Brinton | Nov. 16, 1937 |
| 2,162,609 | Dawe | June 13, 1939 |
| 2,480,103 | Fux | Aug. 30, 1949 |
| 2,620,274 | Lewis | Dec. 2, 1952 |
| 2,623,824 | Gaudry | Dec. 30, 1952 |

OTHER REFERENCES

Morrison Feeds and Feeding, page 29, 21st edition, Morrison Publishing Company, Ithaca, New York.